United States Patent Office 3,053,820
Patented Sept. 11, 1962

3,053,820
AQUEOUS SUSPENSION POLYMERIZATION IN THE PRESENCE OF ALKANE HYDROCARBONS
Harry Wechsler, Leominster, Mass., and Hermas N. Beaudet, Carnegie, Pa., assignors to The Borden Company, New York, N.Y., a corporation of New Jersey
No Drawing. Filed Sept. 3, 1958, Ser. No. 758,667
3 Claims. (Cl. 260—87.1)

This invention relates to suspension polymerization. In particular it relates to an improved process for preparing low molecular weight addition polymers or copolymers.

This application is a continuation-in-part of applications filed by us on April 25, 1955, Serial No. 503,808, and on August 16, 1955, Serial No. 528,836, now abandoned.

Solution polymerization has been used heretofore in preparing low molecular weight addition polymers, with or without adding chain transfer agents. Such polymerization is useful where polymer solutions are desired rather than polymers in separated form. Where resin isolation or even a solution of high concentration is desired, solution polymerization is wasteful and cumbersome because of the necessity of organic solvent recovery, inefficient heat transfer by viscous solutions, high processing cost, difficulty of quality control, and low yields.

Suspension polymerization is generally preferred to emulsion, solution, or bulk polymerization because of the high purity of solid products obtainable and ease of handling and processing.

In preparing addition polymers by suspension polymerization, it has sometimes proved difficult in the past, however, to obtain low molecular weight products and also to produce a suitably fine particle size material. Increase in concentration of a chain transfer agent, in an effort to obtain low molecular weight polymers, frequently has caused unstable suspension systems with agglomeration and lumping of the polymer beads.

This invention provides a novel suspension process whereby monomers having a single polymerizable carbon-to-carbon double bond are homo- or copolymerized to a polymer recoverable directly as a fine powder and suitably of relatively low molecular weight.

Our invention comprises forming a suspension of the monomer or monomers to be polymerized, a monomer-soluble polymerization catalyst, a precipitating agent for the polymer to be produced, and water as the suspending medium, the suspension including to advantage also a protective colloid that is insoluble in the said agent.

The polymer precipitating agent is a non-reactive liquid under the conditions of use, insoluble in water, soluble in the monomer or monomer mixture, and a nonsolvent for the polymer to be produced. It has no labile group reactive at the normal temperatures of polymerization and has a chain transfer constant with styrene at 60° C. of less than $5 \times 10^{-4}$. On this scale, for example, n-heptane has a chain transfer constant of $0.4 \times 10^{-4}$. Alkane hydrocarbons having 4–12 carbon atoms to the molecule, this term including both the non-cyclic and cycloalkanes having the stated number of carbon atoms, meet the requirements and illustrate the class to be used. Examples are n-butane, pentane, n-hexane, octane, cyclopentane, and cyclohexane. As used, they cause fine particle precipitation of the polymer, this term including "copolymer," during the suspension polymerization.

Compounds such as fluorene and carbon tetrachloride, which have high chain transfer constants, can be and suitably are used in small proportion in conjunction with the polymer precipitating agent.

The monomers which are used have a single polymerizable carbon-to-carbon double bond, are water insoluble, i.e. less soluble in water than in the other monomer with which they may be polymerized, and give polymers precipitatable from their solutions in the monomers by paraffin hydrocarbons. Examples that meet the requirements and that may be used are vinyl halides such as vinyl chloride, fluoride, and bromide; vinylidene halides such as vinylidene chloride; vinyl esters such as vinyl acetate; any vinyl ketone; any vinyl ether; styrene and its derivatives; derivatives of acrylic and methacrylic acids; N-vinyl compounds such as N-vinyl pyridine and N-vinyl carbazole; allyl compounds such as allyl acetate and monoallyl phthalate; and unsaturated compounds whose structure can be derived from ethylene by symmetrical substitution such as maleic anhydride and maleic and fumaric acid esters.

A protective colloid of high molecular weight is added to prevent agglomeration of the particles. The colloid used is either dispersible or soluble in water and insoluble in the hydrocarbon liquid serving as precipitant for the polymer to be produced. Examples of such high molecular weight protective colloids that we use are gelatin, polyvinyl alcohol, methyl cellulose, copolymers of vinyl acetate-maleic anhydride, of alkyl vinyl ethers-maleic anhydride, of styrene-maleic anhydride and of vinyl alcohol-vinyl acetate, and copolymers containing acrylic or methacrylic acid residues.

Among the copolymers of vinyl alkyl ethers and maleic anhydride which may be used as the colloid are those made from the methyl-, ethyl-, propyl-, isopropyl, n-butyl-, and isobutylvinyl ethers. These copolymers may be utilized alone or together with other types of surface-active agents, as, for example, ethylene oxide-propylene oxide condensate. These copolymers may be used as such or after reaction with alkaline agents such as sodium hydroxide, ammonia, or amines. Such alkaline agents are considered to combine with part or all of the maleic acid or maleic anhydride residues to form salts or amides.

Polyelectrolytes that serve particularly well the protective colloid are those having a pH of 2–13 in 1% solution in water and containing substantial amounts of acrylic or methacrylic acid residues or both, in the form of soluble salts. Among these are polyacrylic acid, polymethacrylic acid, copolymers of acrylic acid with acrylic or methacrylic esters, copolymers of methacrylic acid with either acrylic esters or methacrylic esters, and mixtures of any of the foregoing. The pH range stated is established by use of alkaline agents such as sodium hydroxide, ammonia, or amines, which are considered to combine with the free acrylic acid or methacrylic acid residues, to form a polyelectrolyte. The results are either partial salts or complete salts of the poly-acids.

Commercial examples of the polyelectrolytes that we use as the polymeric colloid are described below:

"PVM/MA," a 50:50 mole percent copolymer of vinyl methyl ether and maleic anhydride. The specific gravity range is 1.3–1.4. The specific viscosity in 1% methyl ethyl ketone at 25° C. is 0.2–3.

"Polyco 296-N," a 15% aqueous solution of sodium polyacrylate in water, of pH about 11 in 10% concentration.

"Acrysol GS," a 12.5% aqueous solution of sodium polyacrylate, which, when diluted to 1%, has a pH of 8.6–9.

"Acrysol A-1," a 25% solution of polyacrylic acid having a pH of 2.6–2.8 in 1% concentration.

A copolymer consisting of 50 mole percent methyl methacrylate copolymerized with 50 mole percent methacrylic acid, to a 0.2% solution of the copolymer in water, therebeing added sodium hydroxide to a pH of approximately 8.

With the said colloid there may suitably be used also a water soluble ionic or nonionic surfactant that is chemically non-reactive with other materials of the suspension. Examples are the sodium salts of alkyl aryl sulfonates such as sodium decyl benzene or keryl benzene sulfonate, sodium alkyl sulfates such as the lauryl sulfate, and dialkyl sodium sulfosuccinates; potassium or ammonium salts may be used in place of the sodium salts.

Any monomer-soluble catalyst for ethylenic bond polymerization is used to advantage in this process. Representative examples are benzoyl-, lauroyl-, dichlorobenzoyl-, and methylethyl ketone peroxides; t-butyl hydroperoxide; and azo compounds such as azo-bis diisobutyronitrile.

Other conventional materials may be introduced in usual amount and for their usual effect on the polymerization, as, for example, chain transfer controllers or agents such as those disclosed elsewhere herein that are more soluble in the monomer or monomers than in water and activators such as glucose, amines, and the like, all in usual proportions.

Proportions of those of the ingredients that are usual in suspension polymerization are conventional. Thus, the monomer used may be all of one kind. In making a homopolymer of vinyl chloride, for instance, only vinyl chloride is used. To make copolymers, the proportion of one of the plurality of the other monomers required may be as low as 1 part for 100 of total monomer component, the exact proportion varying with the kinds of monomers used and in accordance with known practice in this art and being usually 4–50 parts for 100 of total monomers.

Catalysts are used ordinarily in such amounts as 0.1–3 parts for 100 of the monomer component.

The proportion of the polymer precipitating agent, that is, the hydrocarbon liquid, is about 10–100 parts for 100 of the monomer (or total monomers) used. The exact amount is that required to precipitate (insolubilize) the polymer in the hydrocarbon-monomer-polymer mixture.

The proportion of the polymeric protective colloid is that adequate to prevent settling or agglomeration or both of the beads or drops of the agitated suspended monomer or polymer. Suitable proportions are about 0.01–5 parts for 100 of the monomers and for best commercial results usually 0.1–2 parts, the exact amount varying with the colloid selected.

The surface-active adjuvant is used in the proportion of about 0.01–0.5 parts for 100 of the monomer components.

The water:monomer ratio is about 0.5–10:1 but usually 1–4 parts of water for 1 of monomer.

As to conditions, the polymerization is made to advantage by heating the continuously agitated suspension to a temperature of 20°–150° C., the temperature selected varying approximately within this range with the monomers selected and being usually 40°–100° C. Temperatures below the minimum stated do not give a rate of polymerization satisfactory for commercial operation without the use of an objectionable and uneconomical proportion of catalyst. Higher temperatures are unnecessary and undesirable.

Pressure used is that needed to liquefy the monomers at the polymerization temperature.

The heating and agitation are continued until the polymerization is effected, that is, substantially completed.

During the polymerization as described, the hydrocarbon liquid precipitates the resulting polymer within the suspended droplets containing monomer, hydrocarbon liquid, and the catalyst. For this reason, the droplets become cloudy or milky in appearance. The polymer is thus removed from the sphere of reaction at a stage that may be influenced or predetermined approximately by choosing the proportion of the selected precipitating agent, to cause the precipitation at about the desired level of polymerization of the resulting copolymer. The protective colloid present prevents coalescence and agglomeration of the drops. The water provides a convenient heat transfer medium and prevents sticking to kettle walls.

In general an agitator-equipped reactor is charged with the aqueous phase containing water, the protective colloid, and the desired surfactant, if any. The monomer is mixed with the liquid hydrocarbon, catalyst, and any other monomer-soluble ingredients to be used, and then mixed with the aqueous phase. Control of temperature, pressure, and agitation are provided.

In the agitated suspension there are formed eventually three phases, namely, (1) the continuous aqueous phase containing water, polymeric colloid, and suitably also an adjuvant; (2) the dispersed droplet phase containing monomer, liquid hydrocarbon, catalyst, chain transfer agent, if any, and polymers of intermediate size; and (3) fine solid polymer precipitated within the droplets by the said hydrocarbon liquid.

Recovery of the polymer is effected, after completion of the polymerization, by release of the pressure and volatilization of any condensed gas present, an example being any remaining vinyl chloride monomer, steam distilling or vacuum stripping away the hydrocarbon, and then removing water, as by centrifuging, filtering, or settling of the contents of the reactor, all without change of state.

Examples of this invention, relating first to making low molecular weight copolymers, are given below. Here and elsewhere herein proportions are expressed by weight unless specifically stated to the contrary. The viscosity is stated frequently as relative viscosity, that is, the ratio of the time of outflow of the solution being tested from a standard pipet to the outflow time for the the diluent alone from the same pipet. The relative viscosity for a given polymer or copolymer is a function of the molecular weight, it being lower the lower the molecular weight.

EXAMPLE 1

A charge was made as follows in a pressure kettle equipped with an agitator:

| | Parts |
|---|---|
| Vinyl chloride (monomer) | 1218 |
| Vinyl acetate (monomer) | 182 |
| Water | 4600 |
| Lauroyl peroxide (catalyst) | 6.3 |
| Polyvinyl alcohol-polyvinyl acetate, 88:12 molar ratio (colloid) | 5 |
| n-Hexane (polymer precipitant) | 800 |

The charge was agitated at 52.5° C. with a maximum pressure of 73 p.s.i. for 10 hours. The residual vinyl chloride was then vented and the kettle drained. A yield of 1350 parts of a fine powder polymer was recovered. After purification, it showed a relative viscosity of 1.260 measured at 0.5% concentration in cyclohexanone at 25° C.

By contrast a charge of comparable composition, but with the hexane omitted, gave aggregates of many smaller beads strongly cemented together and stubbornly resistant to grinding or crushing. When a mixture of this resin was milled with dioctyl phthalate in a 1:0.4 ratio, the fluxing was very poor and the individual bead outlines could still be seen in the mass after a half hour's milling at 150° C. The relative viscosity for this copolymer was 1.510, or 0.250 units higher than was obtained in the presence of cyclohexane.

EXAMPLE 2

A suspension was formed of the following:

| | Parts |
|---|---|
| Vinyl chloride | 958 |
| Vinyl acetate | 143 |
| 2,4-dichlorobenzoyl peroxide compounded with dibutyl phthalate (50:50) | 10 |
| Water | 4450 |
| Polyvinyl alcohol-polyvinyl acetate, 88:12 molar ratio (colloid) | 5 |
| Carbon tetrachloride (chain transfer agent) | 40 |
| n-Pentane | 1100 |

The polymerization, carried out at 56° C., gave 980 parts of polymer having a relative viscosity in the 0.5% solution of Example 1 of 1.214. The polymer was in the form of a fine powder.

A mixture of exactly the same materials in the same proportions, but omitting the water, on being heated and processed similarly in a reaction vessel at 56° C., showed a heat transfer that became progressively worse during the run. After 13 hours' heating, the kettle was found to contain a thick layer of polymer cake inside the walls and cover. A large proportion of the product was in the form of hard chunks and lumps. This illustrates one of the advantages of the present process over a solution polymerization system.

EXAMPLE 8

A charge was made up in a pressure kettle equipped with an agitator as follows:

| | Parts |
|---|---|
| Vinyl chloride | 1392 |
| Vinyl acetate | 208 |
| Pentane | 800 |
| Carbon tetrachloride | 40 |
| Dichlorobenzoyl peroxide 50—dibutyl phthalate 50 (catalyst mixture) | 15 |
| 5% aqueous solution of "PVM/MA" (colloid) | 200 |
| Water | 4550 |

The charge was agitated at 300 r.p.m. and 54° C. with a maximum pressure of 100 p.s.i. for 9½ hours. The residual pressure was then vented, the pentane and unreacted monomers stripped, and the kettle drained. An 85% yield of fine powder was obtained. This polymer, after purification, showed a relative viscosity of 1.242 measured at 0.5% concentration in cyclohexanone at 25° C.

The resulting polymer was a fine particle powder which could be blended with plasticizers and fillers without further grinding. The following Compositions A and B are representative. Both were easily and rapidly dispersed on a two-roll rubber mill with the front roll running at 132° C. and the back roll at 99° C. When the milled compositions were passed through a calender at about 92° C., they clung to the calender roll after only one pass, this behavior being characteristic of easy-processing resins which flux thoroughly in the presence of the plasticizer.

Composition A

| | Parts |
|---|---|
| Example 3 product | 19 |
| Flexol 426, dicyclohexyl phthalate (plasticizer) | 6 |
| Dibutyl tin dilaurate (stabilizer) | 2 |
| Stearic acid (lubricant) | 0.25 |
| Titanium dioxide (pigment) | 2 |
| Asbestos fibers (filler) | 22.00 |
| Fibrous talc (filler) | 22.75 |
| Asbestos powder (filler) | 24.50 |

Composition B

| | Parts |
|---|---|
| Example 3 product | 100 |
| Di-2-ethylhexyl phthalate (plasticizer) | 44 |
| Epoxidized soy bean oil (plasticizer) | 9 |
| Calcium carbonate | 290 |
| Titanium dioxide | 25 |
| Asbestos | 290 |
| Normal lead salicylate ("Normasal") | 6 |
| Dibasic lead stearate ("DS-207") | 1 |

EXAMPLE 4

The formulation was exactly as in Example 3 except that (1) the colloid was changed to a mixture of sodium polyacrylate (Polyco 296–N) in 5% aqueous solution, 75 parts, and polyacrylic acid (Acrysol A–1) in 25% aqueous solution, 15 parts, and (2) the surfactant dioctyl sodium sulfosuccinate was used in 5% aqueous solution, 40 parts.

The above formulation was polymerized as described in Example 3. The reaction product was recovered in the form of loosely agglomerated granules which could be easily washed, handled, dried, and ground in an impact type mill. After being ground, the fine particle polymer was found to compound easily with plasticizer; on a two-roll rubber mill it produced a sheet free of flaws and undispersed particles in a short period of time. The heat stability was very good.

EXAMPLE 5

A charge was made and processed exactly as in Example 3 except that the copolymer used as the protective colloid was neutralized to pH 7 with sodium hydroxide before introduction into the mixture. During polymerization the pH fell from 7.0 to 5.2. The final product was similar to that of Example 3, except that the heat stability of the Example 5 product was remarkably better.

EXAMPLE 6

A charge was made and processed exactly as described in Example 3 except that, to the "PVM/MA," there were added 5 parts of the copolymer of ethylene oxide (25 parts) and propylene oxide (75) of molecular weight about 2,000 (Pluronic-L-62). An 82% yield of fine powder was obtained. The powder, after purification, showed a relative viscosity of 1.238 measured at 0.5% concentration in cyclohexanone and at 25° C. This fine particle powder compounded with plasticizers and fillers, without grinding or pulverizing. A composition made up of this product in accordance with the formula of composition A above was easily dispersible and processable on a rubber mill and calender.

EXAMPLE 7

The effect of the precipitating agent in diminishing the molecular weight is shown in this example.

| Comparable Compositions | Parts by Weight | |
|---|---|---|
| | I | II |
| Vinyl chloride | 1,392 | 1,392 |
| Vinyl acetate | 208 | 208 |
| Water | 4,550 | 4,550 |
| 2,4-Dichlorobenzoyl peroxide compounded with dibutyl phthalate (50:50) | 12 | 11 |
| Polyvinyl alcohol-acetate 88:12 molar ratio | 5 | 5 |
| Carbon tetrachloride | 38 | 34 |
| Pentane | 600 | 800 |
| Temperature of polymerization, ° C | 54 | 54 |
| Relative viscosity of product copolymer (0.5% cyclohexanone solution at 25° C.) | 1.275 | 1.210 |

It is seen that the relative viscosity, a measure of the molecular weight, has decreased by 0.065 unit when the pentane was increased from 37.5% based on monomers to 50%.

EXAMPLE 8

The procedure and composition of any of the Examples 1–7 are used except that the mixture of monomers there recited is replaced, in turn, by an equal weight of (1) vinyl chloride, by (2) any one of the other single carbon-to-carbon double bond polymerizable monomers shown herein, and by (3) a mixture of two or more of any of such monomers.

EXAMPLE 9

The procedure and composition of any of the Examples 1–8 are used except that the catalyst of each of those examples is replaced by an equal weight of any of the other catalysts disclosed herein.

EXAMPLE 10

The procedure and composition of any of the Examples 1–9 are used with the substitution of an equal weight of any of the other liquid hydrocarbons disclosed herein as polymer precipitating agents for the liquid hydrocarbon of each of the said examples.

EXAMPLE 11

The procedure and composition of Examples 1–10 are used with the substitution of an equal proportion of any of the other colloids disclosed herein for the colloid of each of the said examples.

Another product is made when the protective colloid is replaced by an equal weight of a copolymer consisting of 50 mole percent methyl methacrylate copolymerized with 50 mole percent methacrylic acid. The copolymer is used at a concentration of 0.2% in water, there being added sodium hydroxide to a pH of approximately 8.

It will be understood that it is intended to cover all changes and modifications of the examples of the invention herein chosen for the purpose of illustration which do not constitute departures from the spirit and scope of the invention.

We claim:

1. In suspension polymerization to produce a low molecular weight polymer in the form of fine non-agglomerated particles, the process which comprises forming a solution containing 100 parts by weight of a monomer selected from the group consisting of vinyl halides, vinyl esters, and mixtures thereof; 10–100 parts by weight of a $C_4$–$C_{12}$ liquid alkane hydrocarbon precipitating agent for the polymer to be produced from the monomer; 0.01–5 parts of a protective colloid selected from the group consisting of gelatin, polyvinyl alcohol, methyl cellulose, copolymers of vinyl acetate-maleic anhydride, of $C_1$–$C_4$ alkyl vinyl ethers-maleic anhydride, of styrene-maleic anhydride, and of vinyl alcohol-vinyl acetate; and 0.1–3 parts of a monomer soluble polymerization catalyst selected from the group consisting of benzoyl-, lauroyl-, dichlorobenzoyl-, and methylethyl ketone peroxides, t-butyl hydroperoxide, and azo-bis-diisobutyronitrile; agitating said solution with 50–1,000 parts of water to suspend said solution as droplets in a discontinuous phase, heating the suspension to a temperature of 20°–150° C. until polymerization is effected, and then separating the polymer from other materials present in the reaction mixture.

2. In suspension polymerization to produce low molecular weight polyvinyl chloride in the form of fine non-agglomerated particles, the process which comprises forming a solution containing, in parts by weight, 100 parts of vinyl chloride monomer, 10–100 parts of pentane, 0.01–5 parts of a vinyl alcohol-vinyl acetate copolymer, and 0.1–3 parts of lauroyl peroxide, agitating said solution with 100–400 parts of water to suspend said solution as droplets in a discontinuous phase, heating the suspension to a temperature of 20°–150° C. until polymerization is effected, and then separating the polymer from other materials present in the reaction mixture.

3. In suspension polymerization to produce a copolymer of vinyl chloride and vinyl acetate in the form of fine non-agglomerated particles, the process which comprises forming a solution containing, in parts by weight, 100 parts of a mixture of vinyl chloride and vinyl acetate monomers, 10–100 parts of pentane, 0.01–5 parts of a vinyl alcohol-vinyl acetate low molecular weight copolymer, and 0.1–3 parts of lauroyl peroxide, agitating said solution with 100–400 parts of water to suspend said solution as droplets in a discontinuous phase, heating the suspension to a temperature of 20°–150° C. until polymerization is effected, and then separating the polymer from other materials present in the reaction mixture.

References Cited in the file of this patent

UNITED STATES PATENTS

| | | |
|---|---|---|
| 2,388,600 | Collins | Nov. 6, 1945 |
| 2,388,602 | Kiar | Nov. 6, 1945 |
| 2,398,344 | Collins et al. | Apr. 16, 1946 |
| 2,434,054 | Roedel | Jan. 6, 1948 |
| 2,599,640 | Joyce | June 10, 1952 |
| 2,675,370 | Barrett | Apr. 13, 1954 |
| 2,719,143 | Van Dijk et al. | Sept. 27, 1955 |
| 2,875,186 | Gerhard et al. | Feb. 24, 1959 |
| 2,875,187 | Gerhard | Feb. 24, 1959 |